United States Patent
Kessler et al.

[11] Patent Number: 6,119,864
[45] Date of Patent: Sep. 19, 2000

[54] STORAGE DEVICE TO ACCOMMODATE BATTERIES OF VARYING SIZES

[76] Inventors: Henry M. Kessler, 12115 Preston Ridge, Dallas, Tex. 75230; Michael J. Zalta, 1306 Lamp Post La., Richardson, Tex. 75080

[21] Appl. No.: 09/301,521

[22] Filed: Apr. 28, 1999

[51] Int. Cl.[7] ................................................. B65D 85/00
[52] U.S. Cl. ............................ 206/704; 206/703; 206/705
[58] Field of Search .......................... 206/38.1, 69, 303, 206/333, 538, 703, 704, 705; 429/99, 100

[56] References Cited

U.S. PATENT DOCUMENTS

| | | | |
|---|---|---|---|
| T896,007 | 3/1972 | Stoneham et al. | 136/173 |
| 3,537,909 | 11/1970 | Horton | 136/173 |
| 3,625,396 | 12/1971 | Phipps | 221/102 |
| 4,209,091 | 6/1980 | Lieberman | 206/333 |
| 4,535,036 | 8/1985 | Kelm | 429/99 |
| 5,117,977 | 6/1992 | Voroba | 206/333 |
| 5,129,546 | 7/1992 | Thielmann | 221/66 |
| 5,199,565 | 4/1993 | Voroba | 206/333 |
| 5,263,577 | 11/1993 | Paratte | 206/38.1 |
| 5,395,263 | 3/1995 | Sandell | 439/500 |
| 5,601,940 | 2/1997 | Denecke | 429/100 |
| 5,631,098 | 5/1997 | Suzuki | 429/1 |
| 5,839,583 | 11/1998 | Pope et al. | 206/704 |

*Primary Examiner*—David T. Fidei
*Attorney, Agent, or Firm*—Slater & Matsil, L.L.P.

[57] ABSTRACT

The present invention relates to a storage device which can accommodate objects of varying sizes. In a preferred embodiment, the storage device includes a drawer for storing the object which can be a battery or pharmaceutical product. The drawer includes a substantially circular housing for accommodating an object of a first size. The drawer also includes a groove disposed within the housing portion of the drawer. The groove can accommodate an object of a second size. A plurality of slots are disposed within the groove. Each of the slots can accommodate an object of a third size. The storage device also includes a sheath in which the drawer is adapted to be latch engaged.

20 Claims, 11 Drawing Sheets

STORAGE DEVICE TO ACCOMMODATE BATTERIES OF VARYING SIZES

FIELD OF THE INVENTION

This invention relates generally to holders and specifically to a storage device which can accommodate batteries of varying sizes, and which can serve a dual or alternate purpose as an illumination source.

BACKGROUND OF THE INVENTION

Containers or holders for storing various personal use objects are well known. Products are typically packaged in some sort of container for shipping as well as for use by an end-user. For example, pharmaceuticals are often stored in a container with seven compartments, one labeled for each day of the week. In this device, however, the pills are not secured and may be jostled or even damaged during transport. In addition, these containers are typically too large to be conveniently transported on one's person or in a purse.

Electrical batteries for personal use items provide another example of personal use objects which would be desirable to store for convenient access until they are required by an end-user. In many instances, the end-user would like to carry one or more spare batteries so that they will be available when it is needed. For example, people often do not wish to be without use of electronic devices such as watches, pagers, hearing aids, electronic keys and others. Therefore, a need exists for a storage device which can hold one or more replacement batteries for convenient transportation and ready access.

Figure 1:
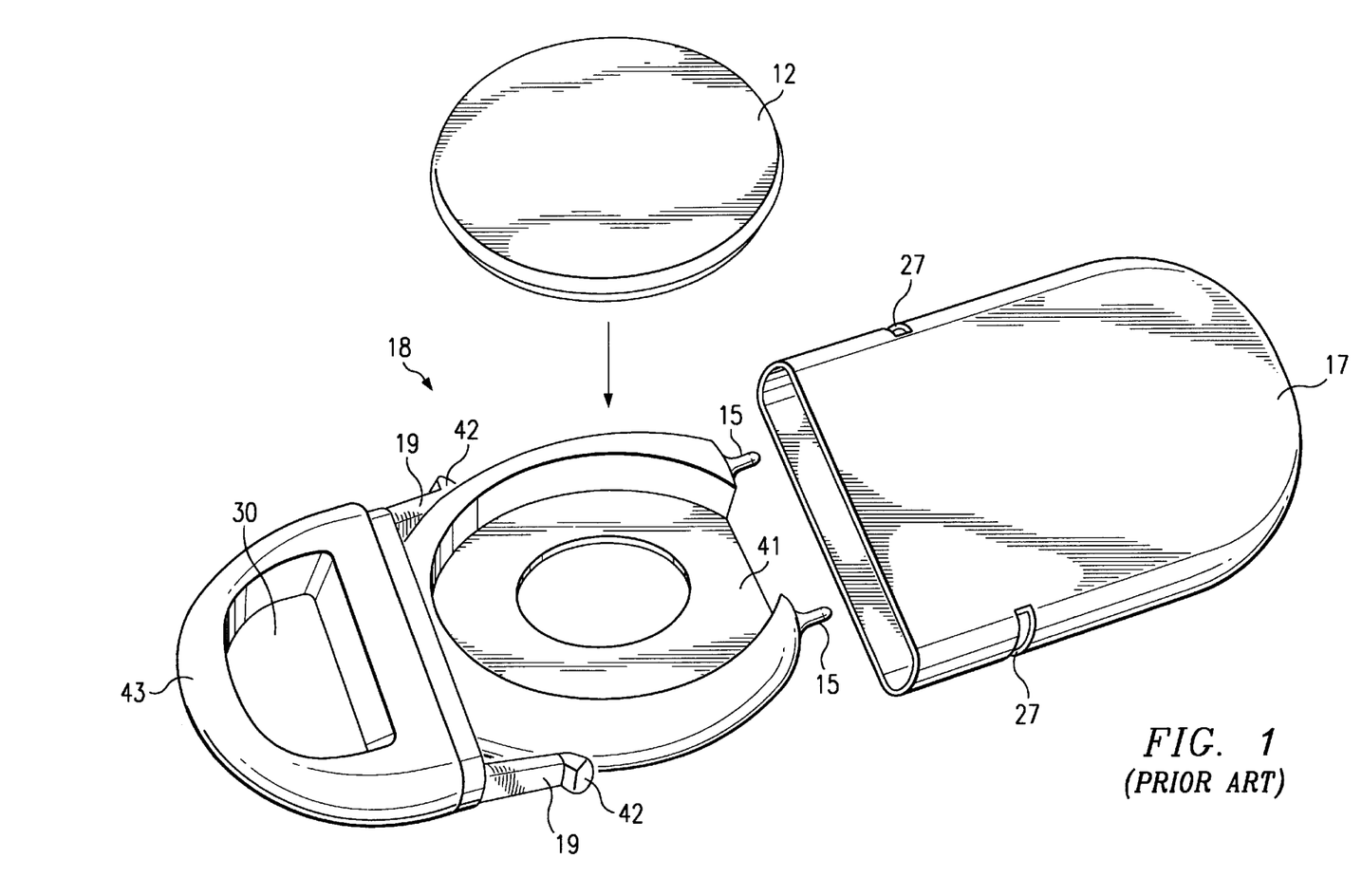
FIG. 1 is a prior art battery holder.

FIG. 1 illustrates a prior art battery holder which is described in detail in U.S. Pat. No. 5,263,577, incorporated herein by reference. For ease of comparison with the prior patent, the reference numerals in FIG. 1 are consistent with the numbering in FIG. 1 of the prior patent.

The prior art holder includes two parts, a first part forming a sheath 17 in which a second part forming a drawer 18 is adapted to be latch engaged. FIG. 1 shows that drawer 18 includes a circular housing 41 in which the battery 12 may be placed.

While the prior art device of FIG. 1 does provide a storage case, the device is fairly limited in that it is designed to accommodate a single, specific type of battery. A need exists in the prior art for a storage device that accommodates different sizes and shapes of batteries in order to increase the utility and flexibility of the device. Also lacking in the prior art is a storage device that is readily adapted to additional or alternate utility, such as providing for illumination as well as for storage. These and other shortcomings of the prior art are overcome by preferred embodiments of the present invention, as described below.

SUMMARY OF THE INVENTION

The present invention relates to a pocket-sized storage device which can accommodate small objects of varying sizes. The pocket-sized container should be small enough to be conveniently transported on one's person or in a purse.

In a preferred embodiment, the storage device includes a drawer for storing the object such as a battery or pharmaceutical product. The drawer includes one or more a recessed floors or hollows for receiving the flat surface of a disk-shaped object. The drawer also includes an elongated groove disposed substantially within the confines of the recessed floor of the drawer. The groove be can dimensioned to receive a cylindrical surface of a cylindrical object. Alternatively, or in addition, the drawer may include a plurality of slots within the groove. Each of the slots is dimensioned to receive an edge surface of a small disk-shaped object. The storage device also includes a sheath in which the drawer is adapted to be latch engaged.

In one specific embodiment, the present invention is a key chain device for holding a variety of different size and shape batteries for multiple uses. Specifically, the device will hold either a cell or multiple cells which are equal to or smaller than a CR2450, a GP23, or up to four cells the size of a 357. Batteries can fit into multiple cavities which are overlapping.

The storage device of the present invention has a number of advantages over prior art storage devices. With this invention, a single storage device can be used for multiple sizes of objects. A battery seller, for example, can offer a single storage device to each of his different customers regardless of which battery the customer will be using. The container, therefore, is versatile enough to be used in different markets but still inexpensive enough to require only a single plastic mold.

In yet another advantageous embodiment, the present invention serves a dual role as a storage device and a flashlight. Alternatively, in one specific embodiment, the present invention can be configured as either a battery storage device or a flashlight with minimum changes to the tooling elastic molds) and manufacturing processes.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention and do not limit the scope of the invention.

A storage device 100 embodying the present invention is designed to accommodate objects of various sizes, and in particular disk-shaped and cylindrical objects. This feature provides for greater versatility and the ability to use a single container 100 for a variety of applications. The storage device is especially suitable for storing and carrying pocket-sized objects, that is objects which are sized to conveniently fit in one's pocket.

A first preferred embodiment is illustrated in FIGS. 2a–2d which show various views of a preferred embodiment drawer 110. FIGS. 3a–3e illustrate various views of a preferred embodiment sheath and FIGS. 4a–4d illustrate various views of the drawer engaged with the sheath. The figures include dimensions in inches. These dimensions are provided to illustrate the preferred embodiment but may be varied to incorporate any of the modifications described herein or other modifications within the spirit of the invention.

The container 100 will first be described with respect to the storage of batteries. The description will then be expanded to include other objects such as pharmaceutical products.

Figure 2A:
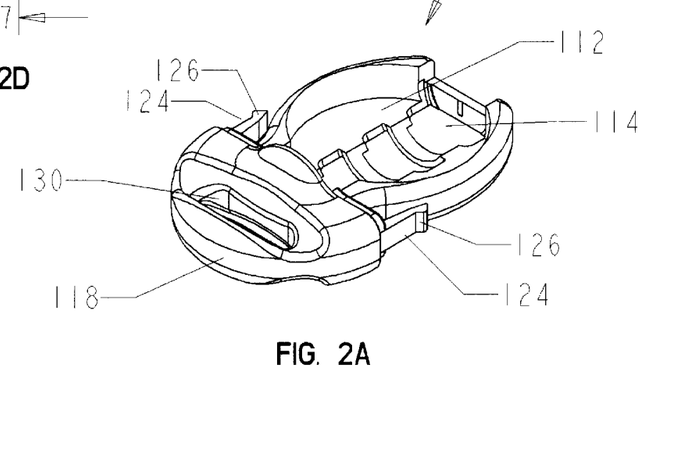
FIGS. 2a–2d are various views of a preferred embodiment drawer.
Figure 2B:
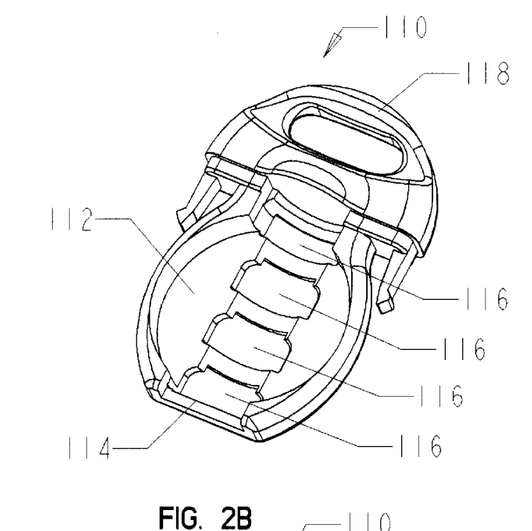
Figures 2C, 2D:
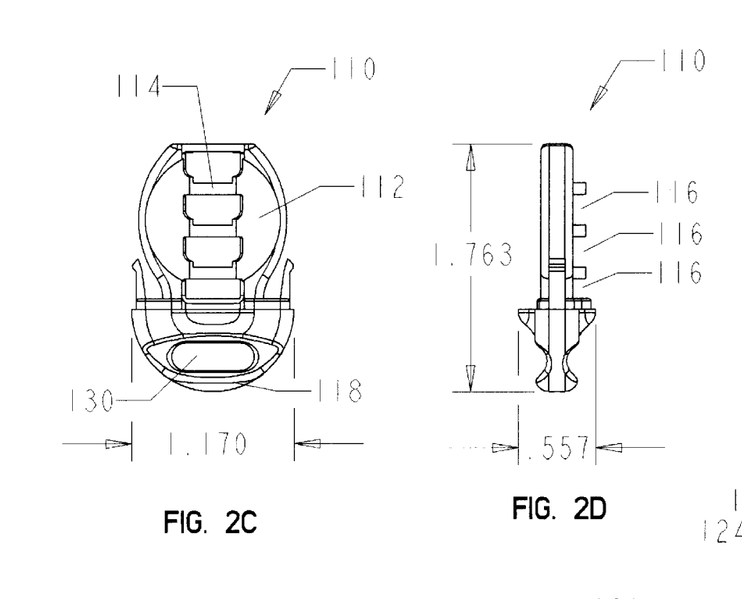
Figure 3A:
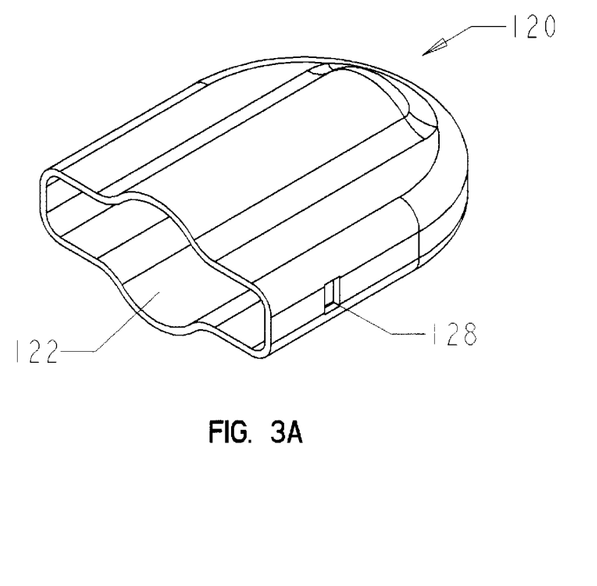
FIGS. 3a–3e are various views of a preferred embodiment sheath.
Figures 3B, 3C:
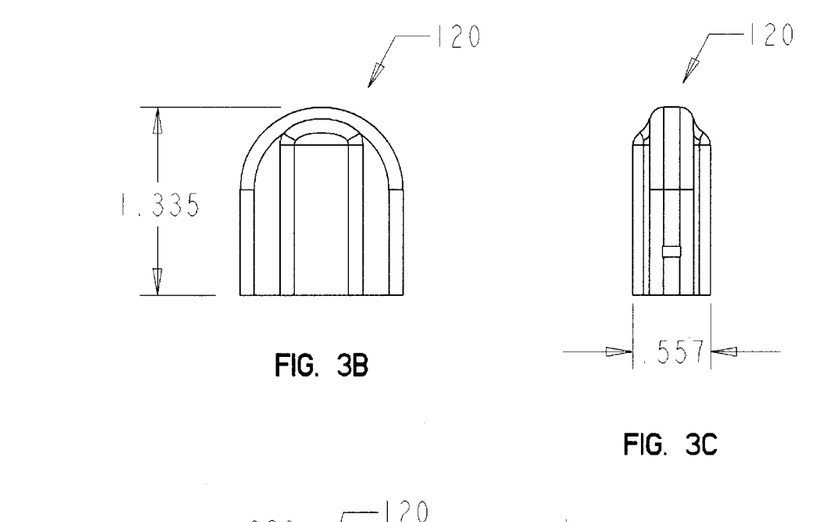
Figure 3D:
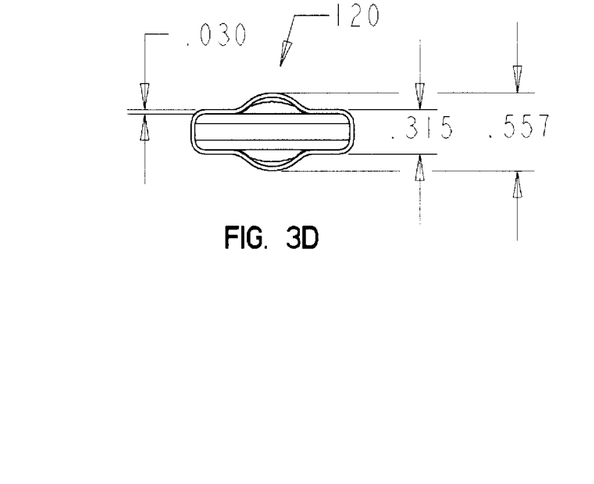
Figure 3E:
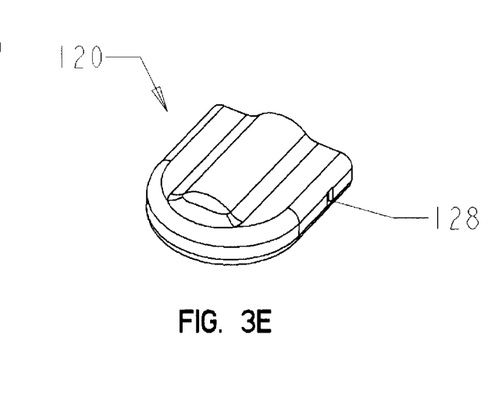
Figures 4A, 4C:
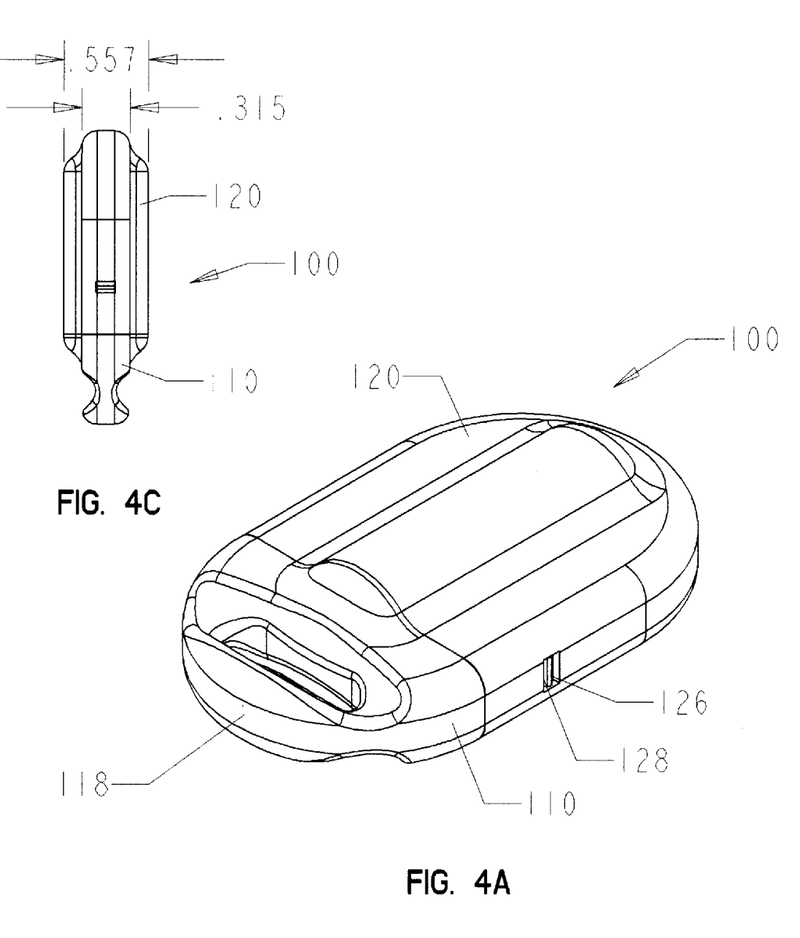
FIGS. 4a–4d are various views of a preferred embodiment holder.
Figure 4B:
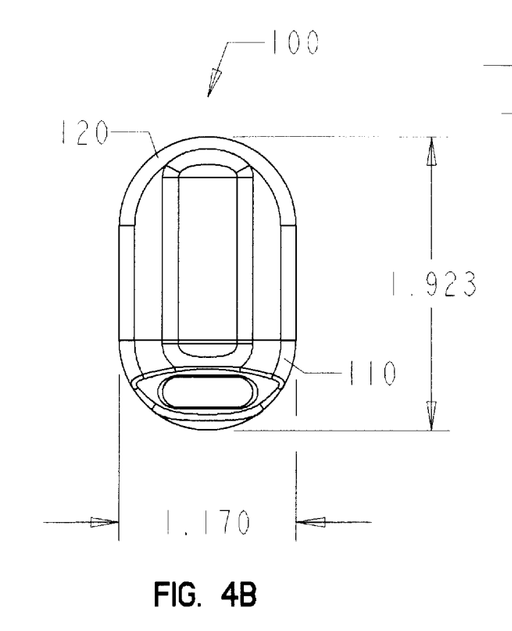
Figure 4D:
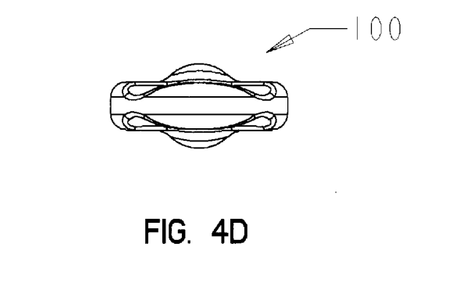
Figures 5A, 5B, 5C, 5D, 5E, 5F:
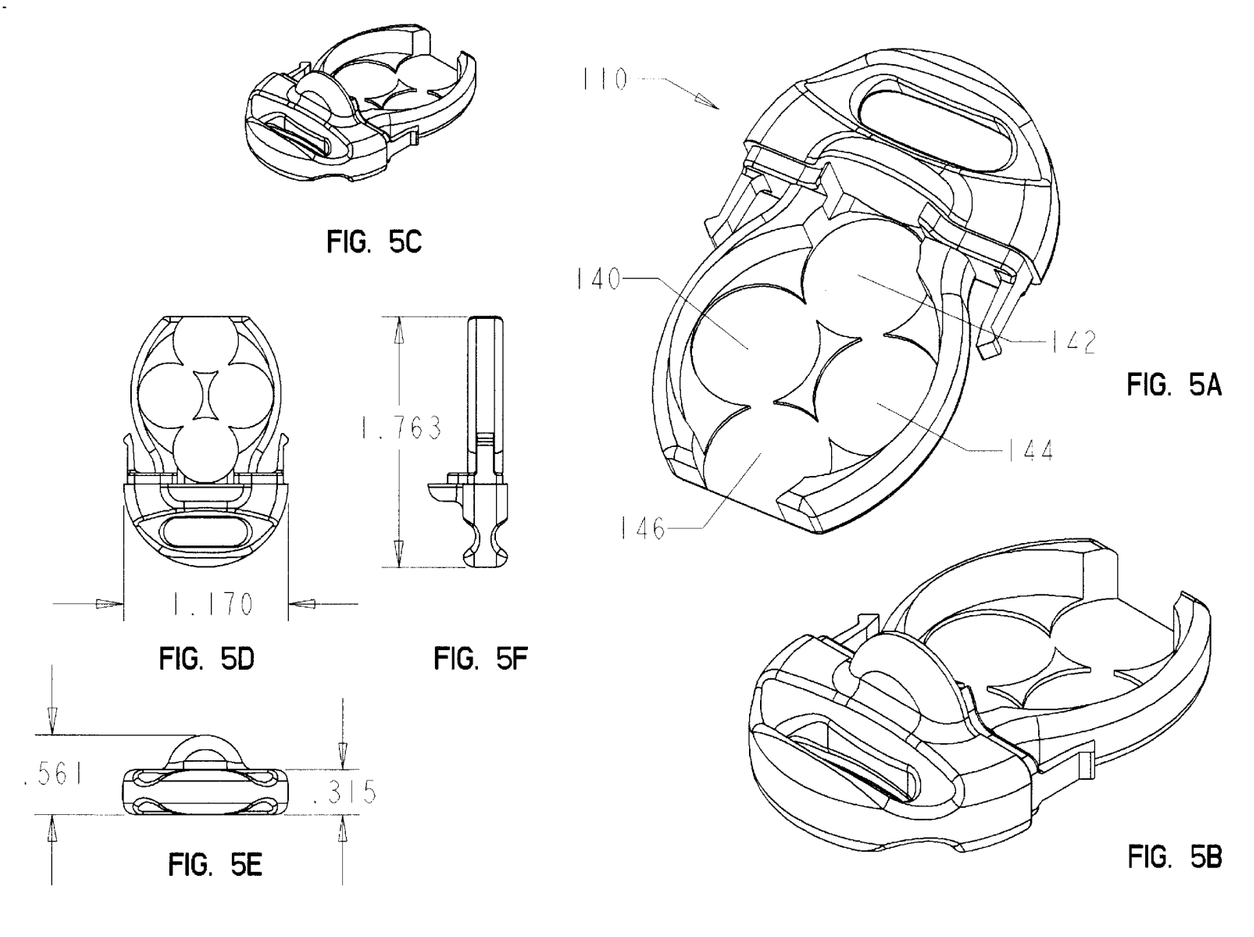
FIGS. 5a–5f illustrate an alternate preferred embodiment drawer.

Referring first to FIGS. 2a–2d, referred to collectively as FIG. 2, a drawer 110 includes a recessed floor 112 for placement of a first size battery. In the preferred embodiment, this drawer is about 1.763 inches in length preferably about 1.17 inches in width and preferably about 0.315 inches thick. In particular, recess 112 will preferably accommodate one or more coin (button) battery type, e.g., those which are 24×5.0 mm or smaller. The recessed floor is illustrated with a circular dimension but could alternatively have any random polygonal dimension (for example, triangle, square, rectangle, pentagon, hexagon, etc.) or rounded dimension (for example, oval). Generally speaking, the recessed floor should be of sufficient dimensions to snugly receive the largest object intended to be stored therein (e.g., a battery).

Drawer 110 also includes an elongated groove 114 that is disposed substantially within the confines of recessed floor 112. Groove 114 is preferably designed to accommodate a cylindrical shaped battery which is 10.12×29.0 mm or smaller (e.g., a GP23 battery). Accordingly, groove 114 has a diameter which is preferably about 0.465 inches and a length which is preferably about 1.13 inches. In another embodiment, groove 114 could be designed to accommodate, e.g., two or four AA or AAA (or smaller) cylindrical batteries.

Drawer 110 also includes a plurality of slots 116 disposed within the groove 114. Each of these slots 116 is preferably designed to hold a small button type battery located edge-wise in the slot 116. In the preferred embodiment, four slots 116 are included thereby allowing storage of anywhere between one and four batteries.

In the illustrated embodiment, the groove 114 and slots 116 are semi-circular in cross-section. In other embodiments, these cross-sections can be other shapes such as ovals, squares, triangles or other polygons.

In the first preferred embodiment, each slot will, for example, accommodate a battery which is 11.6×5.4 mm or smaller (e.g., 357 type silver oxide battery, a LR44 type alkaline battery, or a 675 type zinc-air battery). According, each slot has a radius which is preferably about 0.46 inches, a thickness which is preferably about 0.204 inches, and is spaced from the other slots by preferably about 0.100 inches.

The recessed floor 112 of drawer 110 is designed to accommodate a disk shaped battery by supporting one of its flat faces while the slots 116 accommodate smaller disk-shaped batteries by supporting the edges. Groove 114 supports cylindrical surfaces of batteries.

Because the first preferred embodiment has been designed to hold up to four button shaped batteries which are 11.6×5.4 mm, a variety of market applications can be served, including laser pens which use the #LR44 or #357, hearing aids which use a ZA675, calculators, remote control devices, blood sugar monitors, and more.

Referring now to FIGS. 3a–3e, a sheath 120 which is suitable to be used along with drawer 110 is illustrated. Sheath 120 is designed to receive and enclose the battery holding portions of drawer 110. Accordingly, sheath 120 has an opening 122 at one end which is shaped to conform with the cross-section of drawer 110. Preferably, the size of sheath 120 is not significantly larger in the overall dimension of the drawer 110 so that the overall battery holder 100 will be as small as possible.

Both the drawer 110 and sheath 120 are preferably formed from an electrically insulative material such as a plastic. The material is preferably electrically insulative so that the battery(ies) stored therein will not discharge. Plastics are convenient because a single mold set can be used to produce a great number of holders 100 relatively inexpensively. These holders can then be produced using a single mold and used in a variety of applications.

Referring now to FIG. 2 along with FIG. 3, the drawer 110 is adapted to be latch engaged within sheath 120. To accomplish this goal, drawer 110 includes resilient tongues 124 each of which terminates with a hook 126. The hook 126 is designed to penetrate hole 128 on the side of sheath 120. This mechanism allows latching of the drawer 110 onto the sheath 120 when the drawer 110 is pushed within the sheath 120. The drawer 110 can be disengaged by pushing down on the tongues 124. Alternatively, tongues 124 can be made resilient enough to disengage hook 126 from hole 128 simply by pulling on drawer extension 118. FIGS. 4a–4d illustrate various views of the drawer 110 engaged with sheath 120.

Drawer 110 also includes an extension portion 118 which remains outside the sheath 120 when the drawer 110 is engaged within the sheath 120. The extension 118 preferably enables grasping of the drawer 110 in order to disengage it from the sheath 120. In the illustrated embodiment, the extension portion 118 includes an opening 130 to facilitate the grasping thereof. In the first preferred embodiment, the opening 130 is large enough to allow the battery holder 100 to be placed on a key chain (not shown). Alternatively, a small chain or cord (not shown) could be attached to extension 118 (with or without opening 130). The small chain or cord could include a clasp (not shown) for attaching to a key chain.

FIG. 5a–5f (referred to collectively herein as FIG. 5) illustrate an alternative embodiment for drawer 110 in which recess 112 further includes recesses 140, 142, 144 and 146. These recesses or hollows are somewhat deeper recesses on the floor of recessed floor 112. Recesses 140, 142, 144 and 146 are preferably about 0.465 inches in diameter and are dimensioned to receive, for instance, a 357 size of button battery. Alternatively, recesses 140, 142, 144 and 146 could be of different dimensions to allow for one or more different sizes of batteries to be placed in the respective recesses. In addition, a larger battery of up to 0.985 inches in diameter may be placed on top of batteries stored in recesses 140, 142, 144 and 146, as discussed above with reference to FIG. 2, provided, of course, drawer 110 and sheath 120 are sufficiently thick to allow this. The arrangement illustrated in FIG. 5 allows for greater flexibility in the use of the storage device in that batteries of various sizes may be conveniently stored in a single, handy storage device.

Figure 6A:
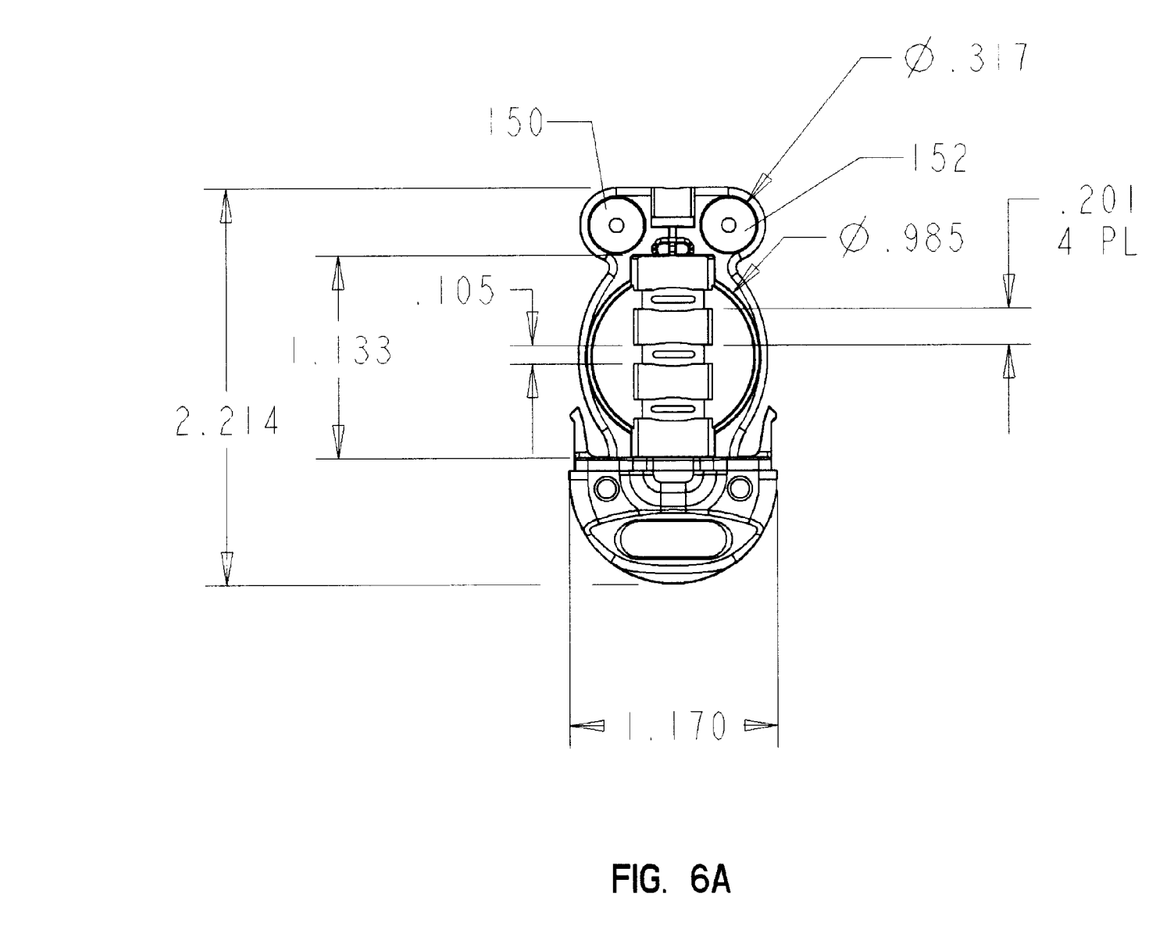
FIGS. 6a–6d are various views of a second alternate preferred embodiment drawer and sheath.
Figures 6B, 6C, 6D:
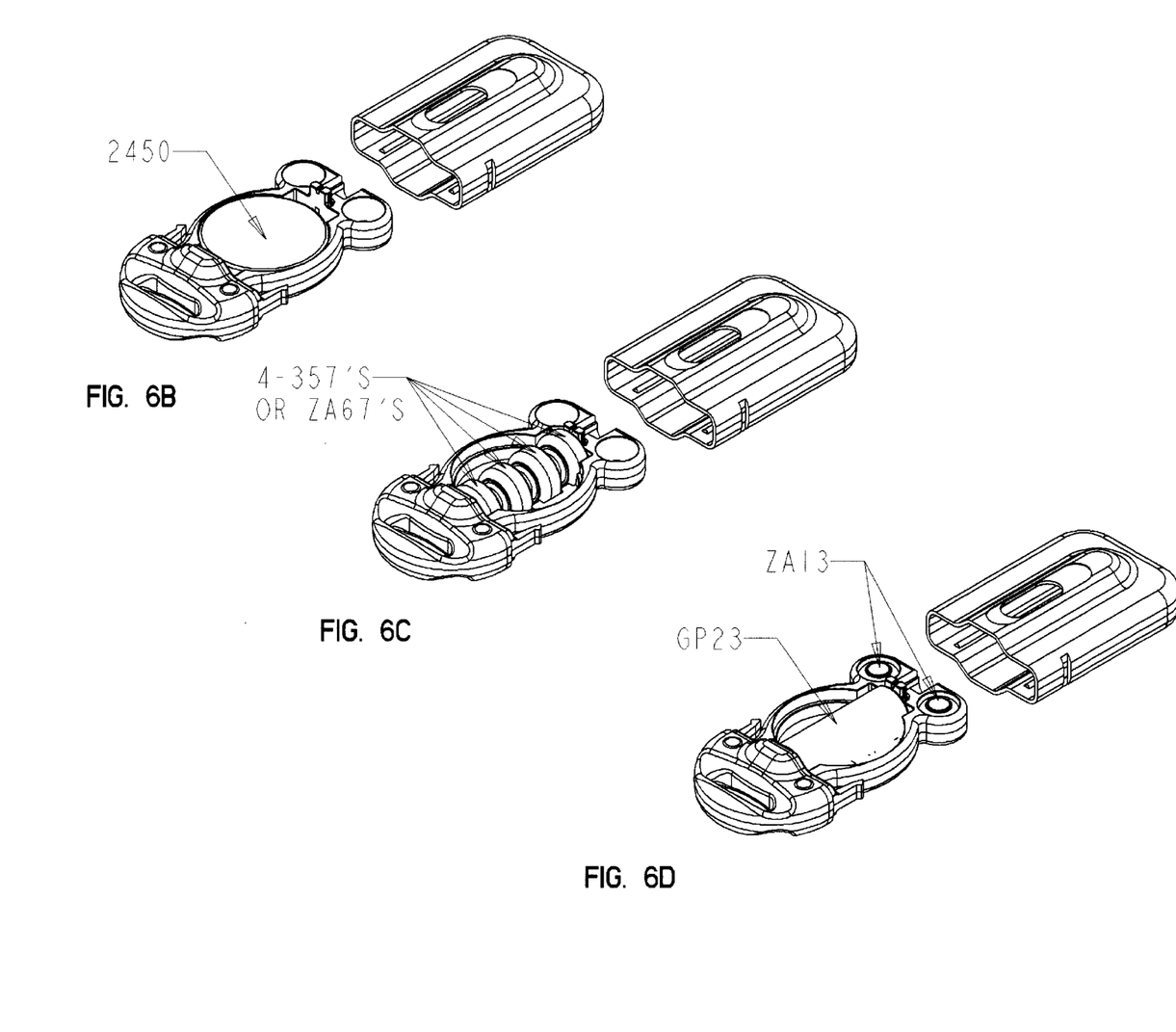

FIGS. 6a–6d, referred to collectively herein as FIG. 6, illustrate yet another alternate embodiment of drawer 110. In FIG. 6, drawer 110 has been elongated so as to provide room for additional recesses 150 and 152. These recesses are dimensioned to allow them to receive the flat surface of a small disk shaped object, such as a ZA13 size or smaller battery. Recesses 150 and 152 are preferably about 0.317 inches in diameter. With the addition of recesses 150 and 152, drawer 110 is by necessity slightly longer, preferably about 2.214 inches, and hence sheath 120 must be proportionately longer as well, so as to receive drawer 110. FIGS. 6a provides a plan view of drawer 110. FIGS. 6b, 6c, and 6d illustrate in perspective view drawer 110 configured to store a single size R2450 battery (or two CR2325 or smaller batteries), four size 357 (or ZA675) and two size ZA13 (or smaller) batteries, or one size GP23 (or smaller) and two size ZA13 (or smaller) batteries, respectively. Note that storage device 100 can accommodate these various configurations without the need to have different models and without the need to have different molds or tools to produce the device.

Figure 8A:
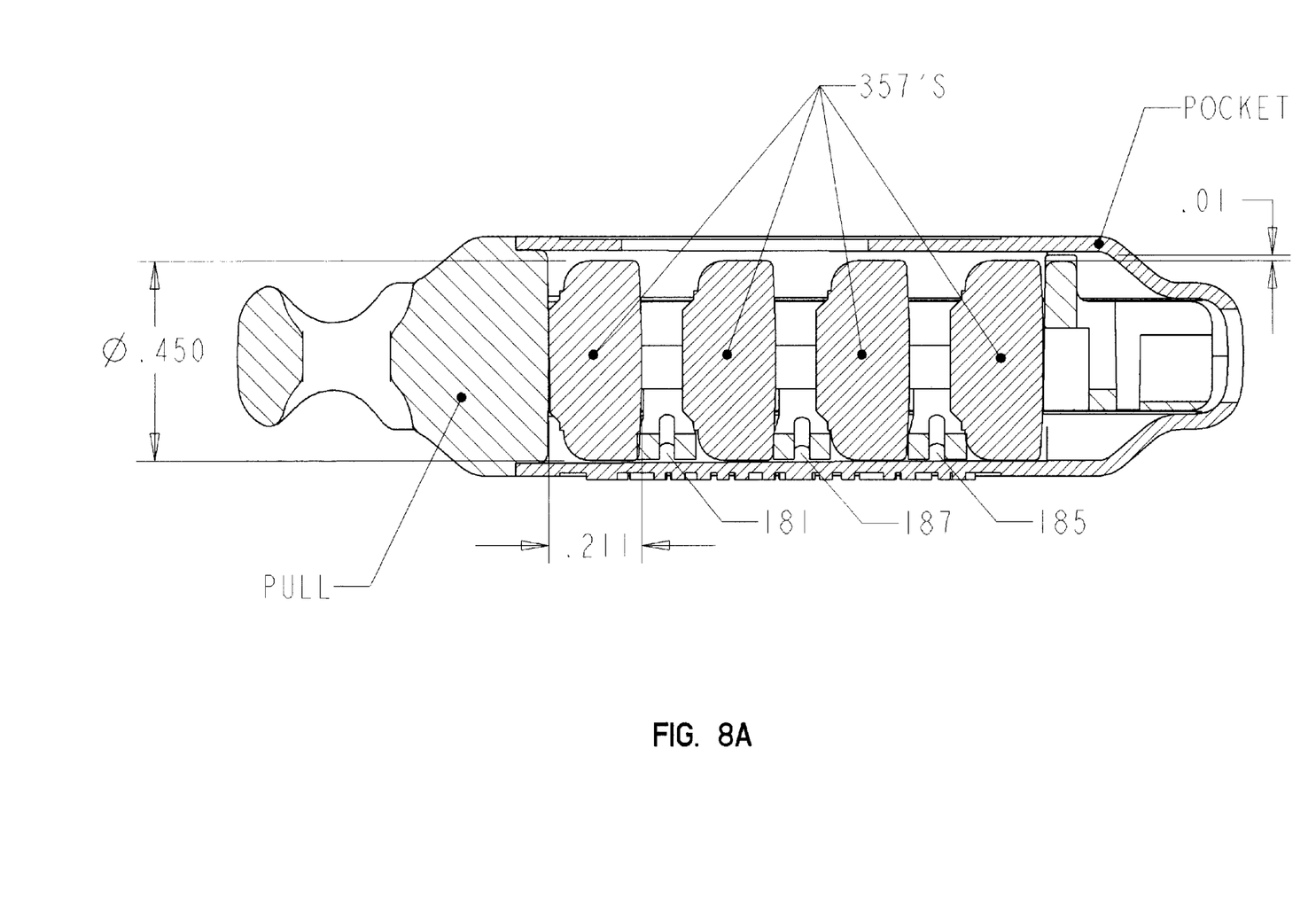
FIG. 8a is a cross sectional view and FIG. 8b is a perspective view of a preferred embodiment drawer.
Figure 8B:
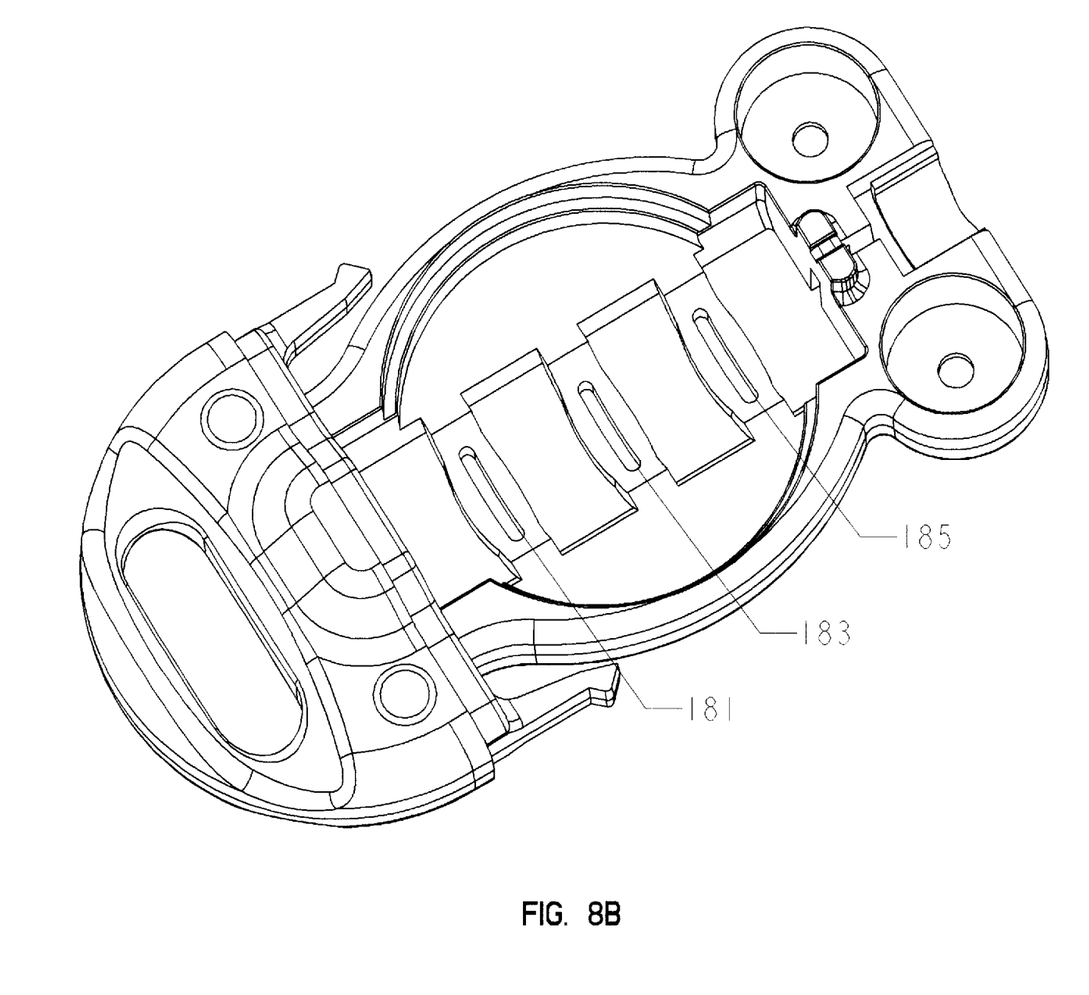

In the preferred embodiments, positive interference slots 181, 183, 185 are formed in the body of drawer 110 between slots 116, as illustrated in FIG. 8. These positive interference slots will deform slightly when batteries spring tension formed by this slight deformation will create positive force on the inserted batteries normal to their major (flat) faces, thus further securing the batteries in the slots 1165. FIG. 8b illustrates in perspective the addition of positive interference slots 181, 183, 185 to slots 116 of drawer 110.

Figure 7A:
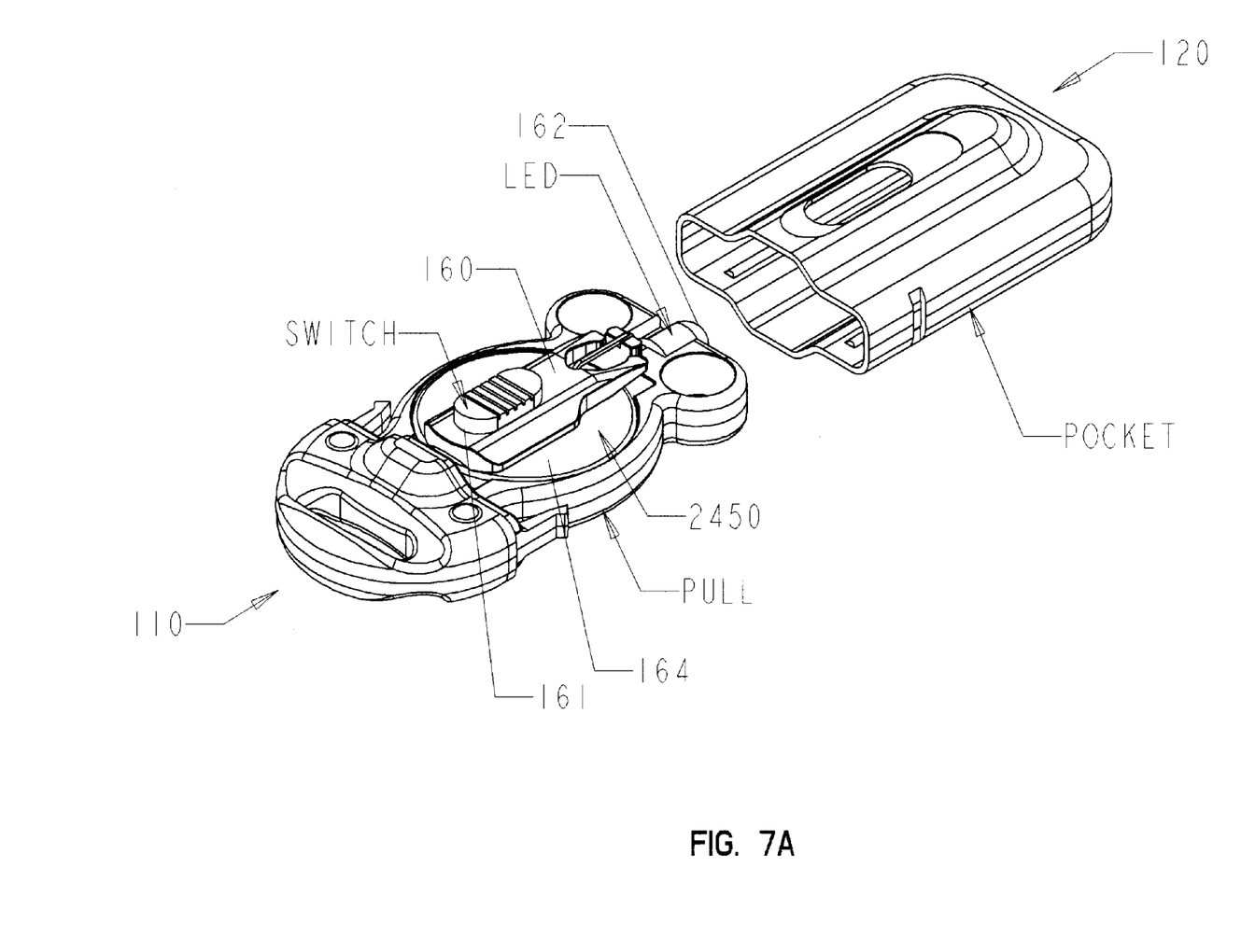
FIGS. 7a–7b illustrate in perspective and exploded perspective an alternative preferred embodiment holder configured as an illumination source.
Figure 7B:
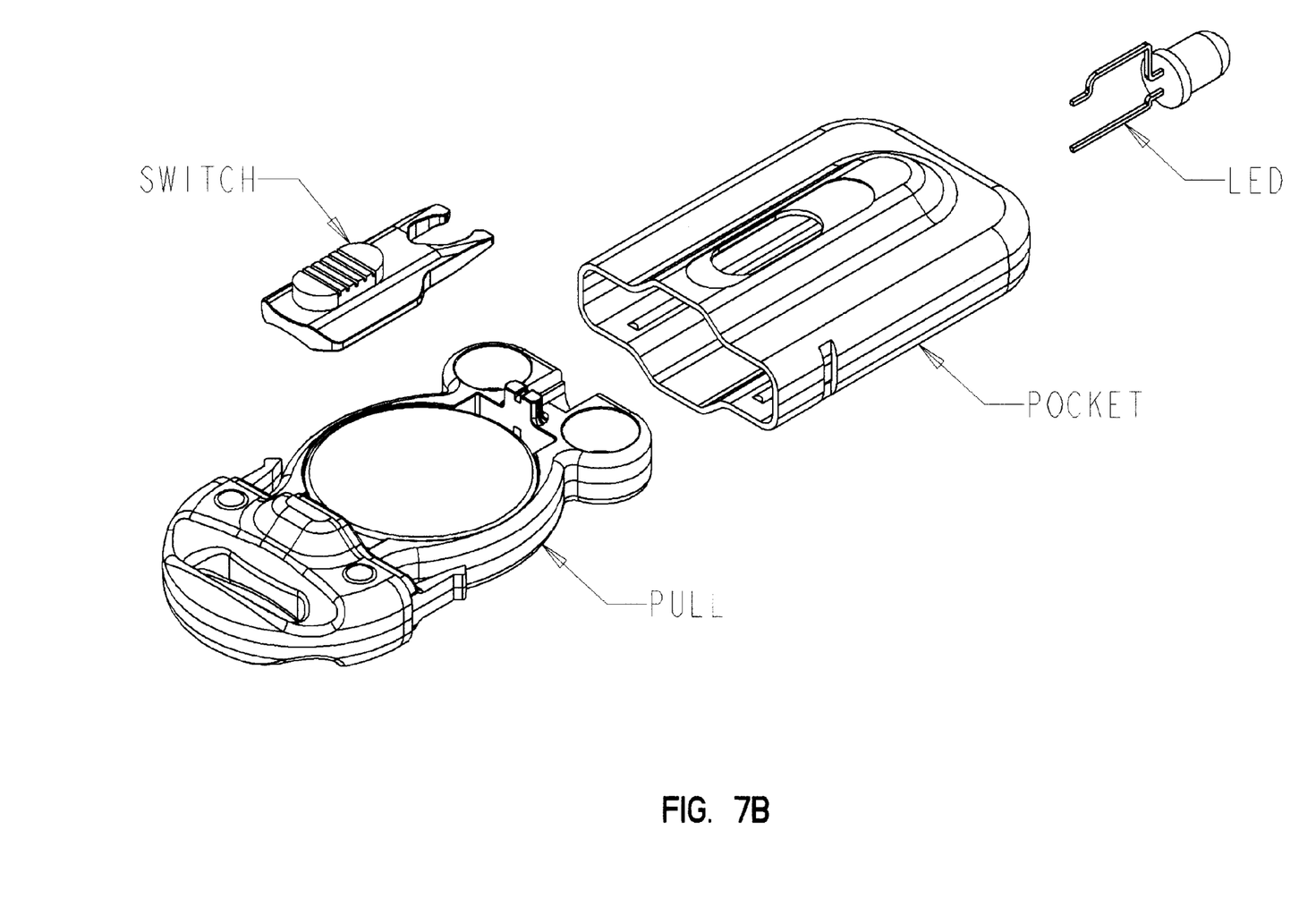

In an additional preferred embodiment, storage device 100 functions alternately and without substantial modification as a storage device, a pocket flashlight, or both. FIGS. 7a and 7b, collectively referred to as FIG. 7 herein, illustrate in perspective and exploded perspective, respectively, storage device 100 configured to function as both a storage device and as a flashlight. Switch 160 is mounted on drawer 112 in a manner as to electrically contact battery 164 residing in recess 112. As illustrated, battery 164 is preferably a size R2450 (or two CR2325) battery although any battery small enough to fit within recess 112 and powerful enough to supply sufficient current to LED 162 will suffice. In the event that battery 164 is significantly smaller in diameter than the diameter of recess 112, switch 162 may be mounted to drawer 110 in a manner as to provide a spring force on battery 164 so as to hold the battery in place. For instance, switch 160 could be mounted upon or integrally formed with drawer 112 such that the switch cantilevers over recess 112 and the distal end 161 of switch 160 is slightly below the lip of recess 112 in its normal state. When battery 164 is inserted into recess 112, it will displace switch 160 slightly. One skilled in the art will recognize that switch 160 can hence be configured to provide sufficient spring tension so as to engage battery 164 firmly enough to prevent the battery from sliding away.

When engaged, either by pressing or by sliding, switch 160 will allow current to flow from battery 164 to LED 162, hence providing illumination. Note that in addition to functioning as a flashlight, the storage device illustrated in FIG. 7 also serves to store spare batteries, such as two size ZA13 batteries in recesses 150 and 152, as illustrated. These batteries do not provide current to drive LED 162 and hence are not run down by use of storage device 100 as a flashlight. In this way, the device provides the dual functionality of both a light source and a compartment for safely storing spare batteries. Comparison of FIG. 6 with FIG. 7 also reveals that no substantial modifications are required to drawer 110 and sheath 120, whether storage device will be configured as solely a battery storage device, as a flashlight, or as a combination device. In this way, manufacturing flexibility is provided.

Several modifications to the illustrated embodiments are possible. For example, battery holder 110 can include a tool portion integral with an outer surface of drawer 110. While the tool is not illustrated in FIG. 2, reference can be made to FIG. 1 to see how the tool 15 could be incorporated with drawer 110. Rather than use nipples 15 designed for a specific task, the tool could comprise, for example, a straight-edge and/or Phillips-edge screwdriver. Alternatively, an awl or other tool could be incorporated.

A battery holder 100 embodying the present invention is useful to serve a variety of applications. For example, battery holder 100 could be used to store batteries for various applications, some of which are listed below.

A) Keyless Entry (to car, house or office)
B) Auto Security
C) Hearing Aid Battery Holder
D) Garage Door Opener
E) Blood Sugar Monitors
F) Hearing Aid Remote Control
G) Calculator
H) Pocket Computer
I) Specialty Advertising
J) Auto Parts
K) General Security In addition to the described embodiments, the present invention could be modified to produce a device in which the wheels commonly used to hold hearing aid batteries could be incorporated into a key chain battery holder.

Alternatively, holder 100 could be used for objects other than batteries. For example, holder 100 could be adapted for use as a case for carrying pharmaceuticals (e.g., medicine such as aspirin or other pills or tablets or tools such as a dropper or syringe).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A pocket-sized storage device for accommodating objects of multiple sizes, the device comprising:
    a drawer for storing an object, the drawer including a recessed floor for accommodating a disk-shaped object of a first lateral dimension, the recessed floor for receiving a flat surface of the disk-shaped object;
    the drawer further including an elongated groove of selected cross-section disposed substantially within the confines of the recessed floor of the drawer, the groove dimensioned to receive a cylindrical surface of a cylindrical object;
    a sheath in which the drawer is adapted to be latch engaged.

2. The device of claim 1 wherein the drawer further includes a plurality of slots of selected cross-section disposed within the groove, each of the slots dimensioned to receive an edge surface of a small disk-shaped object.

3. The device of claim 2 wherein the storage device comprises a battery holder which can accommodate at least one of a circular disk-shaped battery on said recessed floor, a cylindrical battery with a circular cross-section in said groove or a small circular disk-shaped battery in each of said slots.

4. The device of claim 2 further comprising positive interface slots formed between said plurality of slots.

5. The device of claim 1 wherein the drawer includes at least one resilient tongue adapted to latch to the sheath.

6. The device of claim 1 wherein the drawer further includes an extension portion which remains outside the sheath when the drawer is engaged within the sheath, the extension enabling grasping the drawer in order to disengage it from the sheath.

7. The device of claim 5 wherein the extension portion includes an opening to facilitate grasping thereof.

8. The device of claim 1 wherein the drawer further includes a tool portion integral with an outside surface of the drawer.

9. The device of claim 1 wherein the storage device further includes a battery stored in one of the recessed floor, the groove or at least one of the plurality of slots.

10. The device of claim 9 and further comprising:

a first electrical contact coupled to a first terminal of said battery and a second electrical contact coupled to a second terminal of said battery;

a lighting element electrically coupled to the first and second electrical contacts; and a switch coupled between the lighting element and one of the electrical contacts.

11. The device of claim 10 wherein said battery, said lighting element and said switch comprise a circuit and further comprising:

a hollow for storing a second battery, said second battery being electrically isolated from said circuit.

12. A pocket-sized storage device for accommodating objects of multiple sizes, the device comprising:

a drawer for storing an object, the drawer including a recessed floor for accommodating a disk-shaped object of a first lateral dimension, the recessed floor for receiving a flat surface of the disk-shaped object;

the drawer further including an elongated groove disposed within the confines of the recessed floor of the drawer, the groove including a plurality of slots of selected cross-section disposed within the groove, each of the slots dimensioned to receive an edge surface of a small disk-shaped object; and a sheath in which the drawer is adapted to be latch engaged.

13. The device of claim 12 further comprising:

an electrical contact adjacent said recessed floor;

a switch positioned above said recessed floor so as to engage a battery placed within said recessed floor; and a light source coupled to said switch and to said contact.

14. The device of claim 12 wherein the drawer includes at least one resilient tongue adapted to latch to the sheath.

15. The device of claim 12 wherein the drawer further includes an extension portion which remains outside the sheath when the drawer is engaged within the sheath, the extension enabling grasping the drawer in order to disengage it from the sheath.

16. The device of claim 15 wherein the extension portion includes an opening to facilitate grasping thereof.

17. The device of claim 12 wherein the drawer further includes a tool portion integral with an outside surface of the drawer.

18. A pocket-sized storage device for accommodating objects of multiple sizes, the device comprising:

a drawer for storing an object, the drawer including a substantially circular recessed floor for accommodating a disk-shaped object of a first diameter, the recessed floor for receiving a flat surface of the disk-shaped object;

the drawer further including an elongated groove of semi-circular cross-section disposed within the floor of the drawer, the groove having a length and a radius which is smaller than the length, the groove for receiving a rounded surface of the cylindrical object;

the drawer further including a plurality of slots of semi-circular cross-section disposed within the groove, each of the slots having a radius which is greater than the radius of the groove and a length which is less than the length of the groove, each of the slots for receiving a rounded edged surface of a small disk-shaped object; and a sheath in which the drawer is adapted to be latch engaged.

19. The device of claim 18 wherein the drawer includes at least one resilient tongue adapted to latch the sheath.

20. The device of claim 18 wherein the drawer further includes an extension portion which remains outside the sheath when the drawer is engaged within the sheath, the extension enabling grasping the drawer in order to disengage it from the sheath.

* * * * *